(12) United States Patent
Werner (10) Patent No.: US 11,335,500 B2
(45) Date of Patent: May 17, 2022

(54) METHOD AND DEVICE FOR PRODUCING A WINDING ELEMENT (71) Applicant: FRAUNHOFER-GESELLSCHAFT ZUR FÖRDERUNG DER ANGEWANDTEN FORSCHUNG E.V., Munich (DE)

(72) Inventor: Markus Werner, Chemnitz (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 267 days.

(21) Appl. No.: 16/462,182

(22) PCT Filed: Nov. 20, 2017

(86) PCT No.: PCT/EP2017/079820
§ 371 (c)(1),
(2) Date: May 17, 2019

(87) PCT Pub. No.: WO2018/091718
PCT Pub. Date: May 24, 2018

(65) Prior Publication Data
US 2019/0333697 A1    Oct. 31, 2019

(30) Foreign Application Priority Data

Nov. 18, 2016  (DE) .................... 10 2016 122 176.7
Nov. 18, 2016  (DE) .................... 10 2016 122 177.5

(51) Int. Cl.
*H01F 41/00*    (2006.01)
*H01F 41/098*   (2016.01)
(Continued)

(52) U.S. Cl.
CPC ......... *H01F 41/098* (2016.01); *H01F 41/061* (2016.01); *H01F 41/077* (2016.01); *H02K 15/04* (2013.01)

(58) Field of Classification Search
CPC .... H01F 41/098; H01F 41/061; H01F 41/077; H02K 15/04; H02K 15/0471; H02K 15/0485
See application file for complete search history.

(56) References Cited

U.S. PATENT DOCUMENTS 2,371,674 A * 3/1945 Caminez .................. B21F 3/04
                                                           29/896.9
3,320,788 A   5/1967 Meier
(Continued)

FOREIGN PATENT DOCUMENTS

CN         104752051 A    7/2015
DE   10 2013 012 659 A1  2/2015
(Continued)

OTHER PUBLICATIONS

Chinese Office Action for Application No. 201780071575.4 dated Sep. 25, 2020.
(Continued)

*Primary Examiner* — Emmanuel M Marcelo
(74) *Attorney, Agent, or Firm* — Kenealy Vaidya LLP (57) ABSTRACT

The invention provides a method and a device for producing a winding element from a supplied wire, in particular from a round copper wire, said method and device allowing the economical and flexible production of a winding element which, when subsequently used in the field of electrical engineering as a coil or inductor fitted in a stator, ensures the highest possible groove filling factor. For this purpose, the wire is wound to a three-dimensional shape and the cross section of the wire is changed simultaneously, as a result of which separate method steps and therefore tool arrange- (Continued)

ments for three-dimensional winding of the wire as well as the change of the cross-section of the wire can advantageously be dispensed with.

17 Claims, 9 Drawing Sheets

(51) Int. Cl.
*H01F 41/061* (2016.01)
*H01F 41/077* (2016.01)
*H02K 15/04* (2006.01)

(56) References Cited

U.S. PATENT DOCUMENTS

| | | | | |
|---|---|---|---|---|
| 6,141,860 A * | 11/2000 | Shimahara | ............ | H01F 41/077 29/605 |
| 9,666,364 B2 | 5/2017 | Muto | | |
| 2007/0209194 A1* | 9/2007 | Bradfield | .............. | H01F 41/064 29/605 |
| 2015/0183614 A1 | 7/2015 | Muto | | |

FOREIGN PATENT DOCUMENTS

| DE | 10 2014 000 636 A1 | 7/2015 |
|---|---|---|
| EP | 1 578 002 A1 | 9/2005 |

OTHER PUBLICATIONS

International Search Report of the International Search Report for PCT/EP2017/079820 dated Jun. 26, 2018.

* cited by examiner

METHOD AND DEVICE FOR PRODUCING A WINDING ELEMENT

FIELD OF THE INVENTION

The invention relates to a method and a device for producing a winding element from a wire, such as an electrotechnical coil made of a round copper wire.

BACKGROUND OF THE INVENTION

To enhance the performance of electrical machines (such as generators and electric motors) and other power components (such as transformers and inductors), coils made of round wire are increasingly being replaced with rectangular wire or wires otherwise adapted in cross section. With such cross-sectional adaptations, the filling factor, i.e. the ratio of wire cross sections to the entire winding space, which is limited to a maximum value of only about 55% due to the geometric conditions in packetized round wires, can be increased to an order of about 90%.

Figure 13:
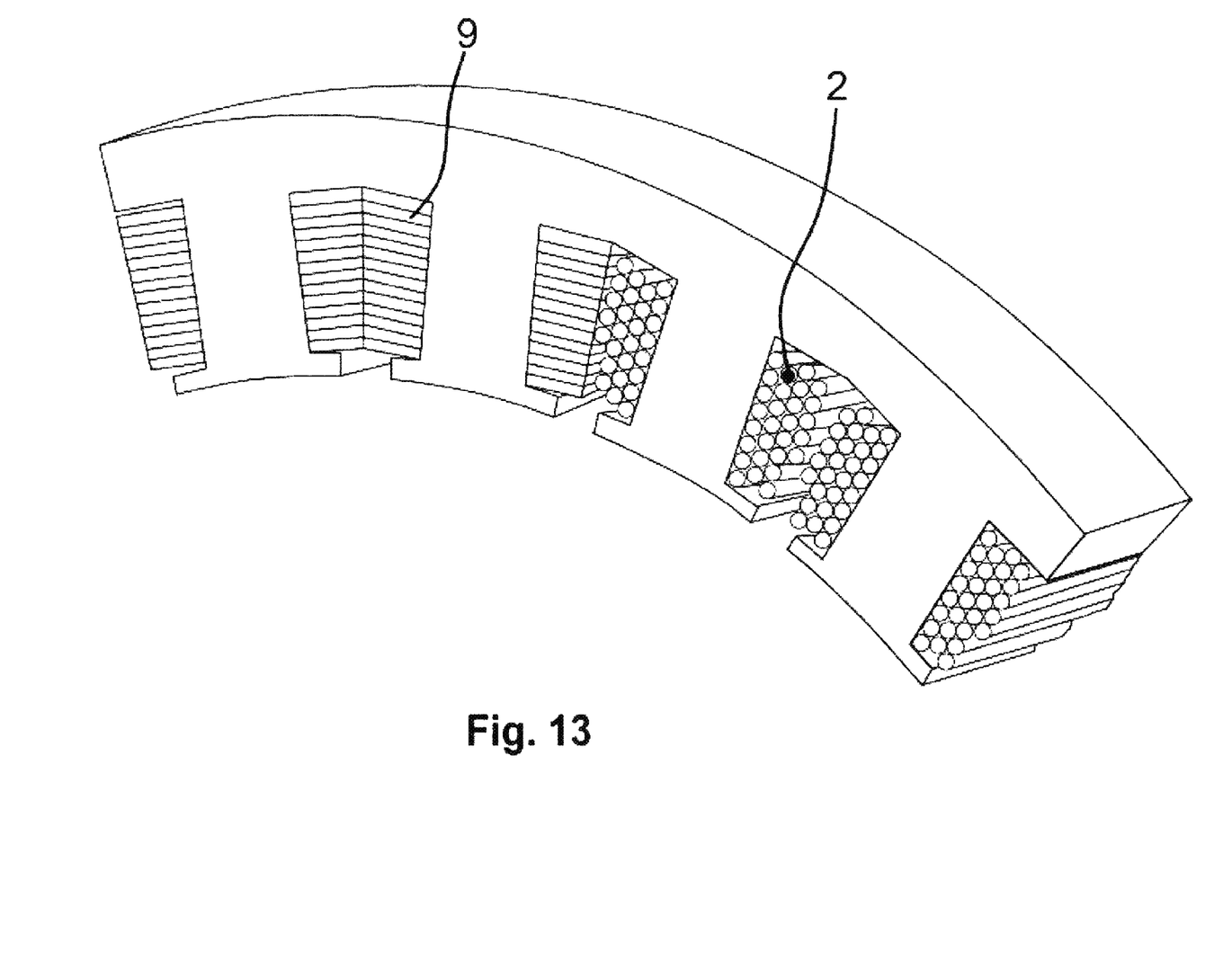
FIG. 13 shows the comparison of the groove filling when using coils made of round wire (right-hand half of the drawing) or flat wire (left-hand half of the drawing) in the stator of an electrical machine.

This significant increase in the groove filling factor is clearly evident from FIG. 13 which shows several coils inserted in the stator of a machine. The coils of wildly wound round wire 2 shown in the right-hand half of the drawing of FIG. 13 exhibit a poor groove filling (and therefore a low filling factor). Due to the round shape of wire 2, gaps filled with air between the individual turns of a coil or between adjacent coils are unavoidable, which leads to relatively poor electrical parameters. Significantly better groove filling (and thus a high filling factor) with fewer air gaps within the coil and between adjacent coils is obtained with the coils wound from a flat wire 9 shown in the left-hand half of the drawing of FIG. 13. This results in a higher efficiency of the respective electrical component. In addition, heat dissipation from the winding is significantly improved. Better heat dissipation of the power sections of the coils in turn leads to an increase in performance of the respective electrical component.

A drawback of the above flat wire coils, however, is that such coils are still very complex and therefore very expensive to produce. DE 10 2013 012 659 A1 describes a method in this context in which a ribbon or wire-shaped semi-finished product is pre-wound to a coil with one or more windings, and this pre-wound coil is then threaded into an embossing tool made of several ring-shaped segments disposed on top of each other. By moving the segments of the embossing tool together, all windings of the pre-wound coil are acted upon by an axial pressure acting in the direction of the coil winding axis and the wire cross sections are thereby shaped in the desired manner.

In contrast to high-energy coil production by casting technology or to highly complex joining processes in which individual windings of different cross sections are only produced in forming steps that are separate from each other and then joined together, DE 10 2013 012 659 A1 does provide a more efficient and therefore more inexpensive way of manufacturing complex coil shapes. However, the two-stage nature of the manufacturing process (requiring pre-winding and a separate embossing step) and the complexity of the required embossing tool, consisting of several segments axially disposed above each other, makes economic and flexible coil production difficult. This is especially true for prototyping and small batch production of coils where long throughput times and tooling costs are unacceptable.

In view of the above-mentioned drawbacks, it is the object of the invention to provide a method and a device with which a winding element (later to be employed as e.g. an electrical coil) that achieves a high filling factor of the wire material, can be produced in an economical and flexible manner from wire (in particular a round copper wire).

SUMMARY OF THE INVENTION

Regarding the method, this object is satisfied with a method for producing a winding element from a supplied wire that includes producing a winding element from a supplied wire, characterized in that winding the wire to a three-dimensionally wound shape and changing the cross-sectional shape of the wire takes place simultaneously. Winding the wire around a rotating mandrel or into a rotating die and into a groove which is fixedly is formed into the outer circumferential surface of the mandrel or the inner circumferential surface of the die, respectively. Pressing the wire into the groove during the winding process with a forming tool that is positionable in the radial direction relative to the mandrel or to the die, respectively, so that the wire is given a rectangular cross-section adapted to the groove cross section; and removing the completed winding element. Winding a wire around a mandrel and into a groove formed between the turns of a helical compression spring mounted on the mandrel and wound in a spaced manner; compressing the compression spring with a punch tool so that the wound wire is formed in its cross section between the adjacent turns of said compression spring; and releasing the compression spring and removing the completed winding element. Regarding the device, this object is satisfied with a device for producing a winding element from a supplied wire having a mandrel rotatable about its central longitudinal axis or a die rotatable about its central longitudinal axis around which or into which the supplied wire can be wound, and a forming tool arranged to exert a cross-sectional forming force upon the wire at a winding point of the wire onto the mandrel or at a winding point of the wire in the die. A mandrel rotatable about its central longitudinal axis or a die rotatable about its central longitudinal axis, on the outer circumferential surface of which or on the inner circumferential surface of which a circumferential groove is formed helically about the longitudinal axis of the mandrel or the die, respectively, into which the wire can be wound during rotation of the mandrel or the die, respectively, and a forming tool adjustable in the radial direction relative to the mandrel or the die, respectively, for pressing the wire into the groove during the winding process, so that the wire is given a cross section adapted to the groove cross section. A method for producing a winding element from a supplied wire, characterized by a mandrel; a compression spring wound helically onto the mandrel in a spaced manner which forms a flexible groove between its turns for winding the supplied wire; and a punch tool for compressing the turns of the compression spring and therefore for cross-sectional deformation of the wire wound between the turns of the compression spring.

Compared to prior art and a complex multi-stage forming technology taught there, both the winding process to give the winding element its desired three-dimensional shape with several helically formed turns wound one on top of the other as well as the cross-sectional deformation of the coil wire by way of the method described above and the device described above take place simultaneously and/or with a tool of a highly simple configuration, so that winding elements exhibiting a high filling factor and virtually no performance-reducing air gaps (as shown in the left-hand half of the drawing of FIG. 13) can be economically produced in a one-step and/or extremely simple and flexible manufacturing process.

DETAILED DESCRIPTION OF THE INVENTION

The approach illustrated in the embodiments of FIGS. 1A and 1B, 2A and 2B, 3A and 3B, 6 and 7 is to transform supplied wire 2 with respect to the cross section to a desired shape (e.g. trapezoidal shape) by use of a shaping tool (e.g., a section roller 3, 3a, 3b, 13) when winding wire 2 (in particular copper wire) with a round or otherwise shaped (e.g., oval or rectangular) initial cross section about a rotating mandrel 1, 11, 21, 31 which represents the interior of resulting winding element 7, 17, 27, 37.

Figure 1A:
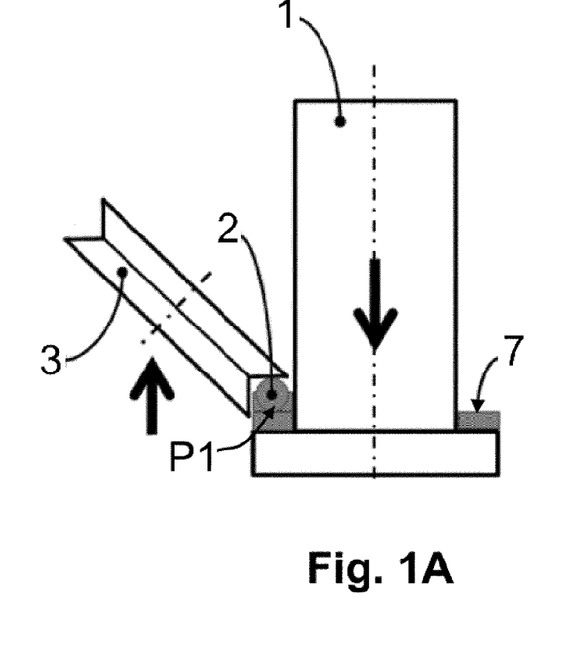
FIGS. 1A and 1B show a first embodiment of a device according to the invention for producing a winding element using a mandrel in a schematic side view and a top view.
Figure 1B:
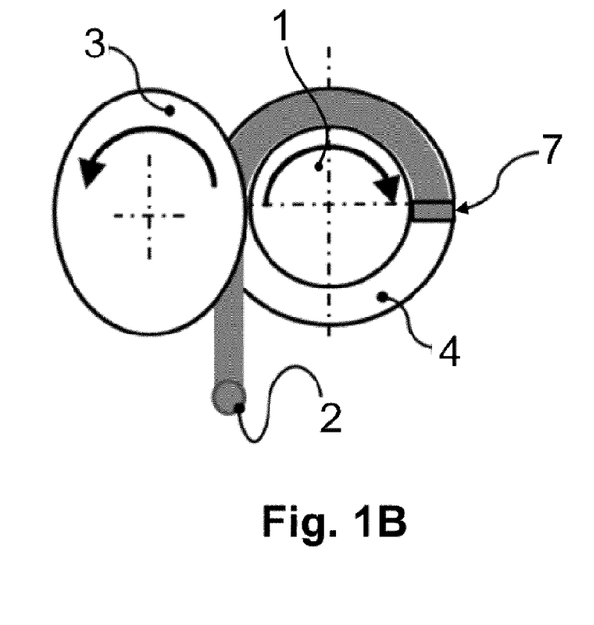

The simultaneous winding of winding element 7, 17, 27, 37 and cross-sectional deformation of supplied wire 2 can be achieved by the devices shown in the figures. A first device according to FIGS. 1A and 1B is shown in a side view and a top view perpendicular thereto. This device comprises a mandrel 1 on which a radially projecting fixed shoulder 4 is formed. Mandrel 1 and shoulder 4 are moved to rotate about their longitudinal axis during the winding process by a drive, not shown. At the same time, mandrel 1 and shoulder 4 are slid downwardly during the winding operation in the longitudinal direction (i.e., in a direction parallel to the axis of rotation) for every revolution of the wire by the height of the rectangular wire cross section in the direction of the arrow.

Due to this superimposition of the rotational motion and the advancing motion of mandrel 1, wire 2 is wound helically under tension to form desired winding element 7.

A substantially cylindrically shaped section roller 3 rotating about its central longitudinal axis is provided for the simultaneous change in cross section. Rotating section roller 3 is arranged such that a forming force changing the cross section is exerted upon wire 2 at winding point P1, i.e. at the point where wire 2 is bent around mandrel 1. Section roller 3 is set at an angle, i.e. the central axis of rotation of section roller 3 and the central axis of rotation of mandrel 1 form an acute angle therebetween, where the direction of rotation of section roller 3 in top view (as viewed in FIG. 1B) directed opposite to the direction of rotation of mandrel 1.

Alternatively or in addition to the advancing motion of mandrel 1 provided with fixed shoulder 4, section roller 3 can also perform an advancing motion directed parallel to the longitudinal axis of mandrel 1 (and therefore of resulting winding element 7) which (in the case of a simultaneous motion of mandrel 1 and section roller 3) takes place in the direction opposite to that of mandrel 1. Due to the advancing motion of mandrel 1 and/or section roller 3, it is ensured that section roller 3 always exerts a forming force at winding point P1 of wire 2 upon the outer surface of mandrel 1 changing the wire cross section. In contrast to an embossing tool (like in DE 10 2013 012 659 A1), where an embossing force changing the cross section acts simultaneously on all turns of a pre-wound coil, the forming force exerted in the device according to the invention by the forming tool (presently: rotating section roller 3) at winding point P1 is limited so that advantageously only small forming forces and moments are necessary in the device according to the invention.

In the case of a cross-sectionally round mandrel 1, 11, the concept of simultaneously winding the three-dimensional winding element shape and changing the supplied wire cross section requires only a purely rotational motion of mandrel 1, 11. In the case of a cross-sectionally rectangular mandrel 1, an additional translational feed motion of mandrel 1.11 and/or section roller 3, 3a, 3b is required.

Figure 2A:
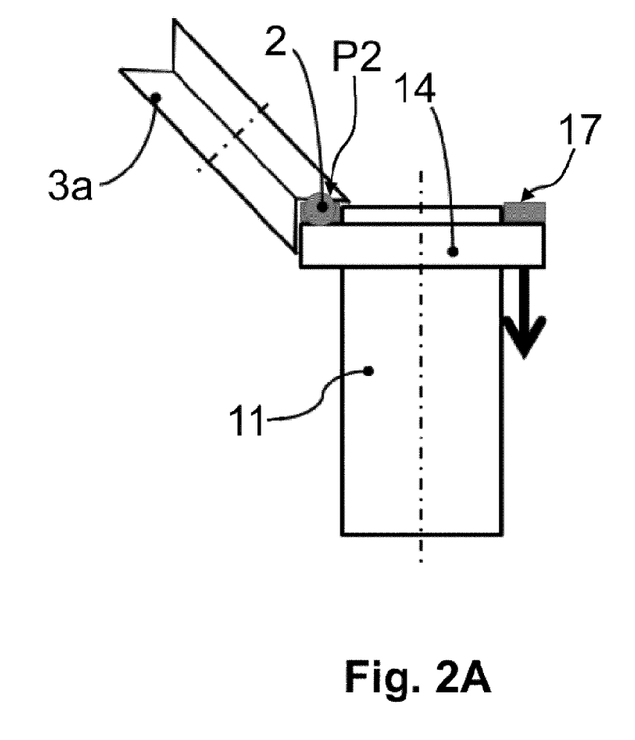
FIGS. 2A and 2B show a second embodiment of a device according to the invention for producing a winding element using a mandrel in a schematic side view and a top view.
Figure 2B:
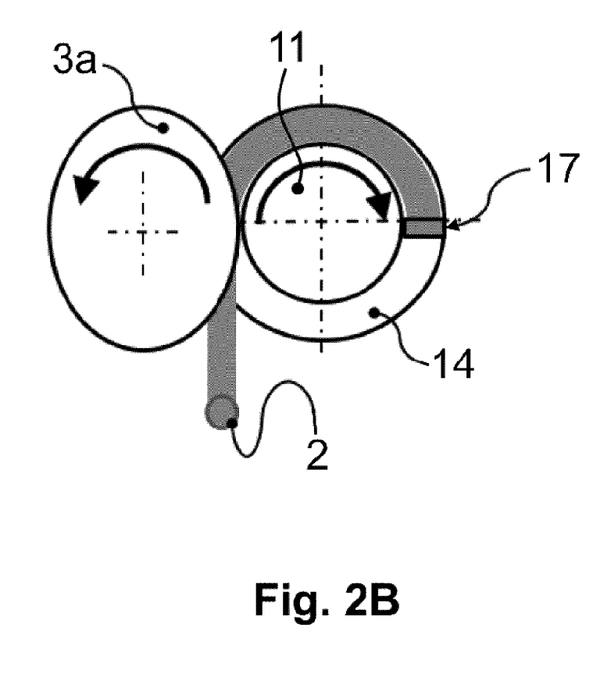

The tool assembly according to FIGS. 2A and 2B, however, differs from that according to FIGS. 1A and 1B only in kinematic respect. Radially projecting shoulder 14 is not fixed, but slidable relative to mandrel 1 in the longitudinal direction. As a result, mandrel 11 and section roller 3 are fixed in their position and perform only a rotational motion about their central longitudinal axis during the winding process. In the course of the winding process, shoulder 14 is continuously moved back from the face side of mandrel 11 with increasing length of winding element 7. Winding point P2 of wire 2 around mandrel 11, on which the cross-sectional change also takes place at the same time, is therefore always formed to be stationary at the face side (in FIG. 2A at the top) of mandrel 11.

The tool assembly according to FIGS. 3A and 3B has a configuration that is structurally similar to that previously described with reference to FIGS. 2A and 2B. According thereto, shoulder 14 is again mounted slidable in the longitudinal direction relative to mandrel 11, so that winding point P2 always remains stationary at the upper face side of mandrel 11 shown in FIG. 3A, with the advantageous consequence that section roller 3a as well as mandrel 11 can be guided in a stationary manner in their longitudinal direction position. Due to the advancing motion effected with the progressing wire supply and increasing number of turns of winding element 7 from movable shoulder 14 in the longitudinal direction, axial support of coil 14 is ensured at all times to cause a locally limited cross-sectional formation of supplied round wire 2 at winding point P2 under the action of pressure by section roller 3.

Figure 3A:
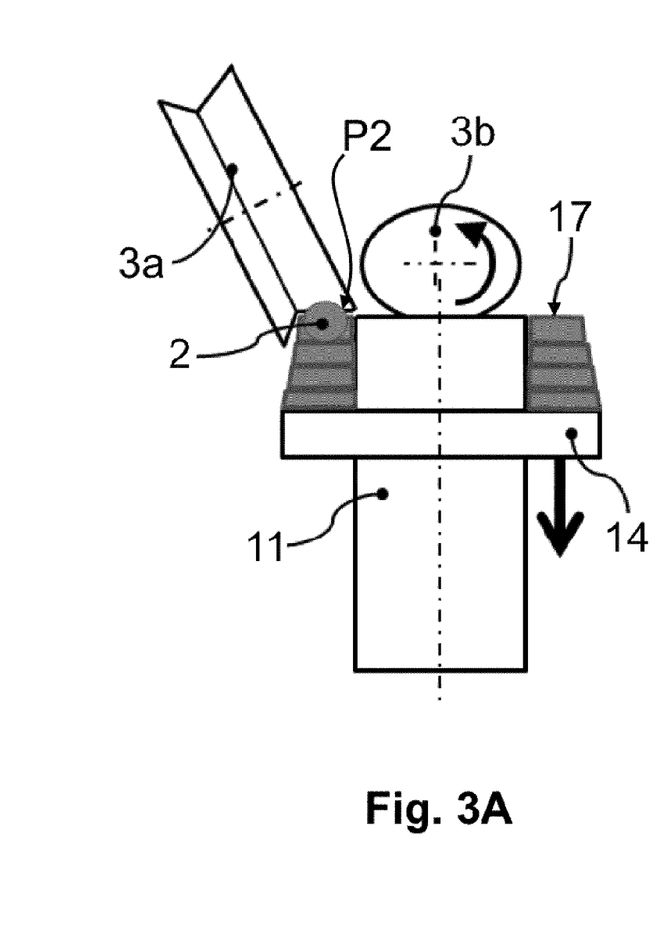
FIGS. 3A and 3B show a third embodiment of a device according to the invention for producing a winding element using a mandrel in a schematic side view and a top view.
Figure 3B:
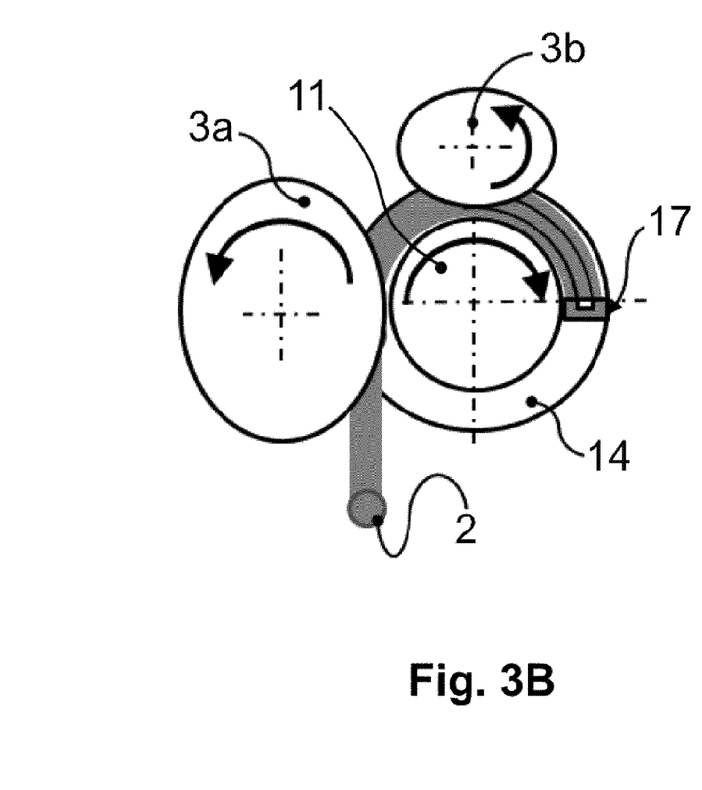

The only structural difference to the embodiment according to FIGS. 2A and 2B is that according to FIGS. 3A and 3B not only one, but two section rollers 3a, 3b are mounted along the outer circumference of mandrel 11. First rotating section roller 3a has the same arrangement and orientation as section roller 3 used in the foregoing embodiments. Accordingly, the central axis of rotation of this first section roller 3a also extends at an angle to the axis of rotation of mandrel 11 (and therefore to the winding axis of winding element 17), where a forming force changing the wire cross section is generated in that supplied wire 2 is passed under pressure between the outer circumferential surface of section roller 3a, the outer circumferential surface of mandrel 11 and the surface of shoulder 14 or the last turn wound onto shoulder 14, respectively. The change in cross section occurs directly at winding point P2 on the outer circumferential surface of mandrel 11.

Second section roller 3b as seen in top view according to FIG. 3B is offset at an angle of about 90° relative to first section roller 3a. By using this second section roller 3b, the cross-sectional shape of the wire cross section can be subjected to an additional forming operation. This additional forming operation can be e.g. that edges are rounded or cooling tabs are formed or embossings (to achieve a reinforcement effect) or channels (to create a fluid guide) are formed.

A conical winding element 17 having a trapezoidal wire cross section that continuously changes in the wire longitudinal direction is produced with the tool assembly shown in FIGS. 3A and 3B. Such a conical configuration of winding element 17 is particularly advantageous for the installation of coils with preferably no air gap into trapezoidal grooves, as they are commonly present between the pole teeth of a stator (see FIG. 13). In order to equip winding element 17 with a conical outer surface adapted to this installation situation, section roller 3a performs an adjusting motion in the direction of mandrel 11 (likewise rotating about its longitudinal axis) in addition to the rotational motion about its longitudinal axis, so that a continuous reduction of the coil outer diameter arises as the winding progresses and the advancing motion of shoulder 14 consequently progresses. Second section roller 3b can also be adjusted in the radial direction of the mandrel in adaptation to first section roller 3a in such a way that the position of a deformation (e.g. channel, beading, etc.) additionally introduced into the wire material by this second section roller 3b is adapted to the conically tapering coil element outer diameter. By way of numerical control of the direction and speed of the translational motions performed by shoulder 14 and section rollers 3a, 3b, almost any convex or concave outer contour can be created in the winding element 17 to be produced.

FIGS. 1a to 5 each show by way of example a device for producing a winding element 7, 17 with, as seen in top view, concentric circular turns. However, with a corresponding cross-sectional configuration of mandrel 1, 11 or of die 5a, 5b, respectively, a device according to the invention can also be readily used for producing coils with, as seen in top view, non-round, in particular substantially rectangular turns.

The cross-sectional deformation of supplied round wire 2 is achieved in each of the three embodiments of FIGS. 1A to 3B at the beginning of the winding process in that wire 2 is drawn under pressure through the opening formed between the grooved outer circumferential surface of section roller 3, the face side of shoulder 4, 14 (in the figures facing upwardly), and the outer circumferential surface of mandrel 1, 11 (cf. in particular FIG. 2A). In this manner, supplied round wire 2 is formed to a flat wire having a rectangular wire cross section during the winding process. According to FIG. 13, when using winding element 7, 17 as a coil, such a wire cross section ensures a very high filling factor of the electrically conductive wire material in the grooves of an electrical machine. With progressing wire supply and an increasing number of turns, round wire 2 is no longer pressed directly against the surface of shoulder 4, 14 for cross-sectional deformation, but against the surface of the preceding turn (cf. in particular FIGS. 1A and 3A). However, shoulder 4, 14 always forms a support necessary for the cross-sectional deformation occurring at winding point P1, P2 for receiving the press forces acting in the axial direction.

Figure 4:
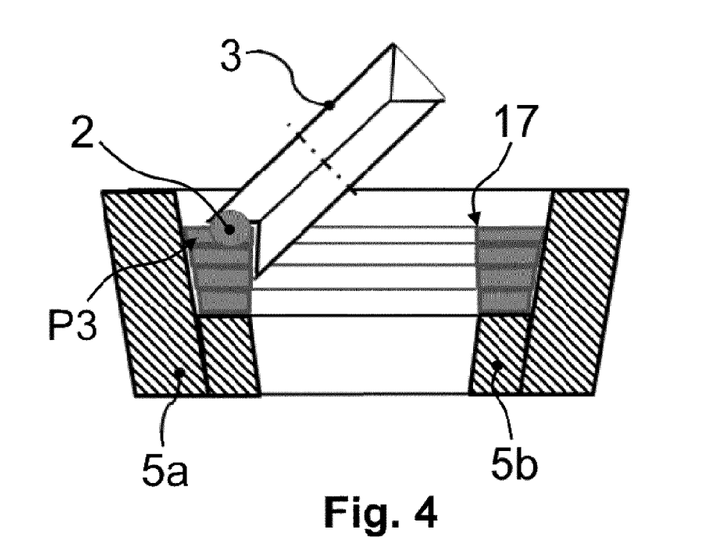
FIGS. 4 and 5 show two alternative embodiments of a device according to the invention for producing a winding element using a die in a schematic longitudinal sectional view.
Figure 5:
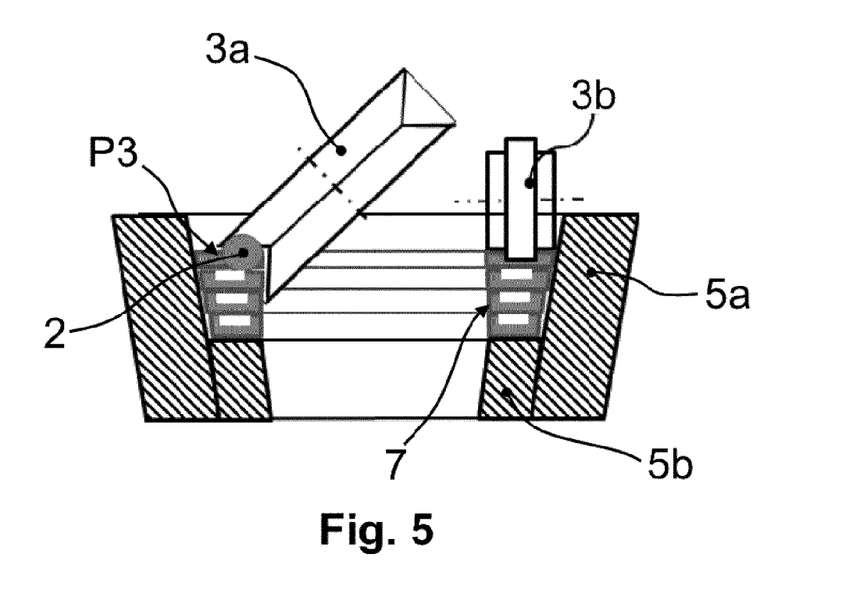

The device shown in FIG. 4 is advantageously used, in particular, in the manufacture of large electrotechnical coils. Wire 2 is there no longer wound around the outer circumferential surface of a rotating mandrel 1, 11, but instead pressed against the inner circumferential surface of a die 5a, 5b and there wound helically to the desired three-dimensional winding element geometry along the inner circumferential surface of the die 5a, 5b by the rotational motion performed by die 5a, 5b about its central longitudinal axis.

For pressing against the inner circumferential surface of die 5a, 5b, a section roller 3 which rotates about is longitudinal axis and is set with its longitudinal axis at an angle relative to the longitudinal axis of die 5a, 5b is again used. The inner circumferential surface of the die (more precisely that of die member 5a) is correspondingly configured at an angle in order to form winding element 17 with a conical outer surface and a correspondingly trapezoidal wire cross section that changes continuously in the winding element longitudinal direction.

Like already in the previous embodiments, the cross-sectional deformation of the conductor supplied as a round copper wire 2 in FIG. 4 takes place directly at winding point P3, i.e. at the point at which supplied copper wire 2 is bent onto the inner circumferential surface of die 5a, 5b. The cross-sectional deformation is performed with pressing round copper wire 2 between the outer circumferential surface of section roller 3 and the inner circumferential surface of die 5a, 5b. In order to provide a support necessary for the cross-sectional deformation not only in the radial, but also in the axial direction, die 5a, 5b is provided on its inner circumferential surface with a radially inwardly projecting shoulder 24. For this purpose, the die is formed in two parts, a first die member 5a with its inner circumferential surface representing the radial boundary of produced winding element 17, and a second die member 5b which forms shoulder 24. The first (lowermost) turn of resulting winding element 17 rests on this shoulder 24.

In correspondence to FIGS. 3A and 3B, the use of a die 5a, 5b proposed in FIG. 4 for producing large coils with large bending radii can also be further developed in such a way that a second section roller 3b is arranged downstream of a first section roller 3a for cross-sectional deformation of wire 2 at winding point P3 to perform an additional forming operation on the wire cross section during the winding process. Such a further development is apparent from FIG. 6, where a second section roller 3b is provided (in top view, offset by an angle of about 90° relative to first section roller 3a) which subjects the wire cross section to an additional forming operation during the winding process (e.g. for the purpose of introducing a bead-shaped depression in order to achieve a reinforcement effect or to provide channels for fluid guidance).

Instead of a rotating section roller 3, 3a, 3b set at an angle, as shown by way of example in FIGS. 1A to 5, any other form tool (e.g. a punch, a roller.) which is adapted to change the cross section of supplied wire 2 in its shape during the winding process at winding point P1, P2, P3 or at a downstream point can be used. The relative setting angle between mandrel 1, 11 or die 5a, 5b, respectively, and section roller 3, 3a, 3b according to the above-described FIGS. 1A to 5 can there be selectively adjusted such that rebound effects and the like are compensated and balanced.

Figure 6:
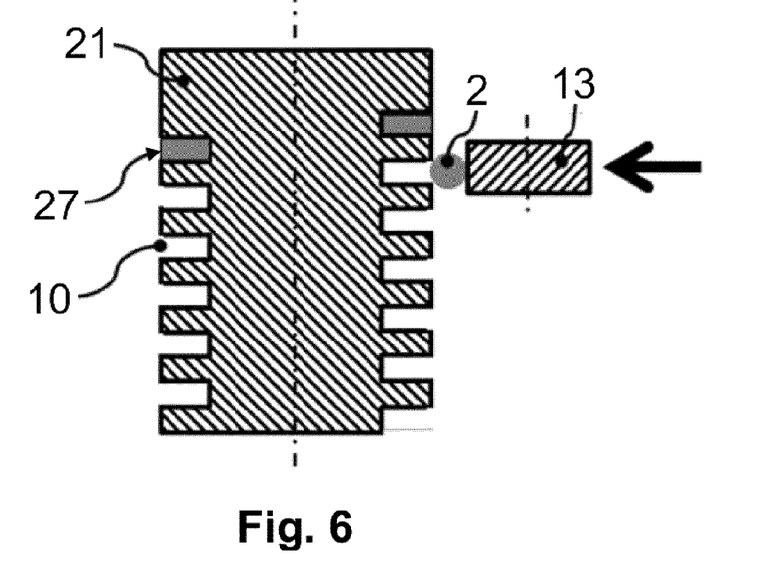
FIGS. 6 and 7 show two alternative embodiments of a device according to the invention for producing a winding element using a mandrel with a fixed groove in a schematic longitudinal sectional view.
Figure 7:
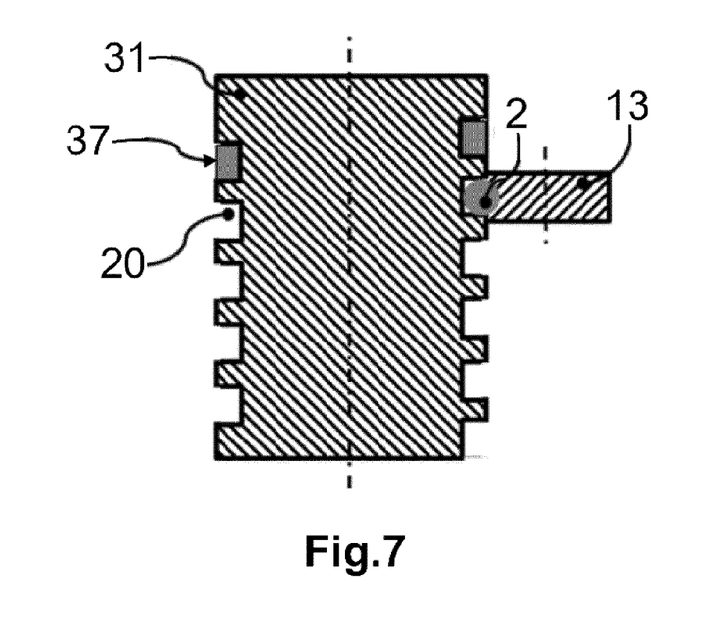

Also with the device shown in FIGS. 6 and 7, an electrically conductive wire 2 (in particular copper wire) with a round initial cross section in accordance with FIGS. 1A to 3B is wound around a mandrel 21, 31 and fills the interior of resulting coil 27, 37 during the winding process and is at the same time made to assume a desired shape (presently: a trapezoidal shape) with respect to the conductor cross section by use of a forming tool (namely a section roller 3 rotating about its longitudinal axis). Furthermore, winding the wire and changing its cross-sectional shape in accordance with the embodiments described above also occurs simultaneously in FIGS. 6 and 7.

In a further development of the preceding embodiments, however, a respective fixed helical groove 10, 20 is formed in the two devices according to FIGS. 6 and 7 on the outer circumferential surface of mandrel 21, 31 into which wire 2 is drawn/wound during the winding process with mandrel 21, 31 rotating. Groove 21, 31 has a rectangular shape in cross section with a longitudinal dimension directed in the longitudinal direction of mandrel 21, 31 and a width dimension directed in the radial direction of mandrel 21, 31 corresponding to the wire cross section of winding element 27, 37 to be produced. By use of a forming tool 13, which is applied in the radial direction of mandrel 21, round wire 2 is pressed into the groove and is thereby given a rectangular cross section corresponding to the groove cross section. The radial adjusting motion of forming tool 13 is symbolized in FIG. 6 by a thick black motion arrow. In the devices of the invention according to FIGS. 6 and 7, a section roller 13 rotating about its central longitudinal axis again serves as a forming tool, where the longitudinal axes (axes of rotation) of mandrel 21, 31 and section roller 13, however, are there aligned parallel to one another.

The winding operation is not affected by section roller 13 due to a rotational speed of section roller 13 being adapted to the rotational speed of mandrel 21, 31, where section roller 13, however, transmits the necessary press force due to its adjusting motion via the outer surface to round wire 2 for forming the wire cross section in groove 10, 20. Section roller 13 and groove 10, 20 in FIGS. 6 and 7 therefore act quasi as a punch and matrix for local formation of the wire cross section from the initial round shape to the desired rectangular shape. Not explicitly shown, but within the meaning of the invention, is to provide groove 10, 20 on the outwardly open side with inlet slopes or inlet roundness so that pressing the wire material into groove 10, 20 with section roller 13 is facilitated.

In correspondence to the devices of FIGS. 1A to 5, the devices of FIGS. 6 and 7 also provide the possibility of simultaneously producing the three-dimensionally wound shape of winding element 27, 37 and the cross-sectional shape of wire 2 in a continuous process using a single tool assembly. Compared to winding and the subsequent die forming, the die is therefore omitted, but can nevertheless be used to calibrate a winding element 27, 37 produced in accordance with FIGS. 6 and 7. High flexibility in the production of winding element 27, 37 is achieved for the reasons of low expenditure of resources (requiring only the provision of a mandrel 21, 31 and a section roller 13), the manufacturing device being configured in a relative simple manner, and the possible numerical controllability of the positioning and trajectory motions of the forming tool (section roller 13). As a result, the manufacturing process can be used in an economical manner also for relatively small quantities, as they are frequently encountered due to the trend of customizing products.

Winding element 27 produced with the device of FIG. 6, whose wire cross section has a larger width dimension than length dimension, requires a suitable coating or lubrication of the groove surfaces in mandrel 21 to assist the material flow of the wire material in groove 10. In contrast, the variant shown schematically in FIG. 7 with a smaller width dimension than length dimension in the cross section of the wound wire and therefore in the cross section of groove 20 is technically easier to implement, since there are much smaller flow paths for the wire material and the use of a coating or lubrication could be dispensed with.

After completion of the simultaneous winding process and the cross-sectional formation of the initially round wire 2 shown in FIGS. 6 and 7, a winding element 27, 37 having a rectangularly flattened wire cross section is obtained which is snugly received in helical groove 10, 20 of winding mandrel 21, 31. In the case of a cylindrically wound winding element 27, 37, this coil 27, 37 could simply be screwed off from mandrel 21, 31. However, if a winding element deviating from the ideal cylindrical shape is to be produced, then winding mandrel 21, 31 is to be configured to be dismantled to several parts, as coil 27, 37 can be removed from this winding mandrel 21, 31 without deformation only by disassembling winding mandrel 21, 31.

Figure 8:
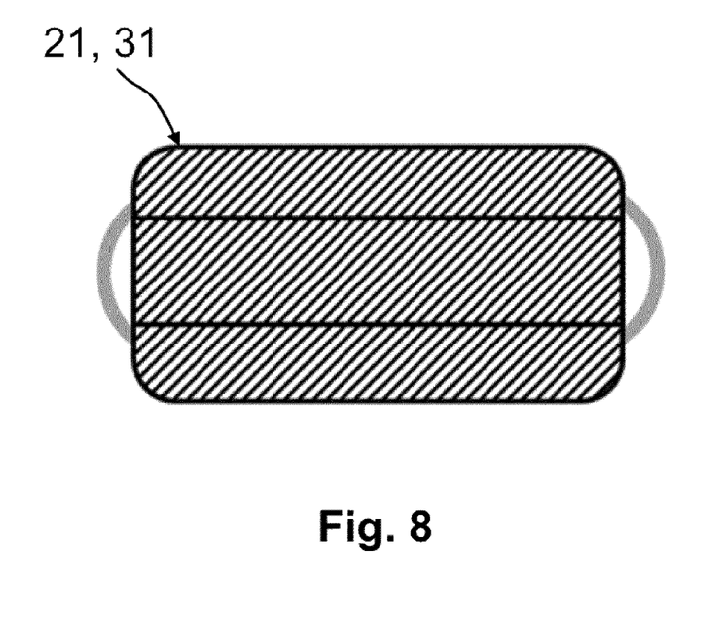
FIGS. 8 and 9 show two alternative embodiments of a multi-part mandrel used in the device of the invention according to FIGS. 6 and 7 in a cross-sectional view.
Figure 9:
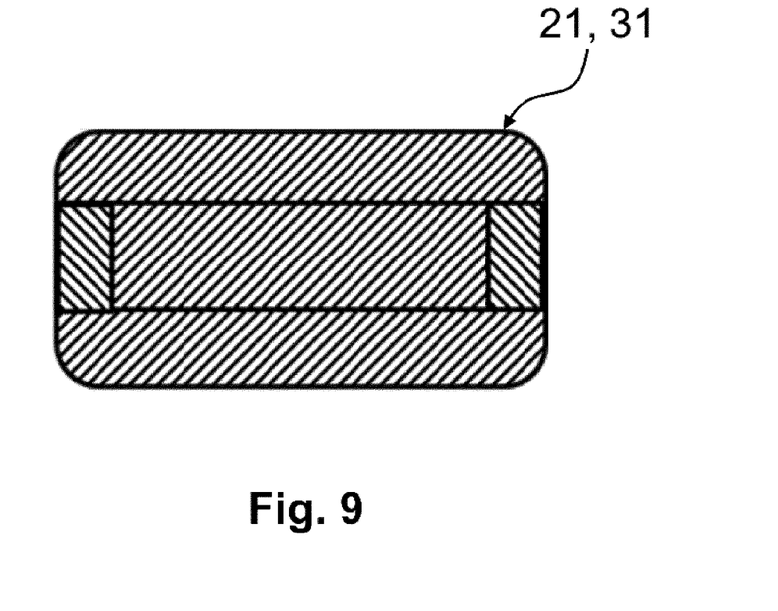

FIGS. 8 and 9 respectively show the multi-part embodiment of a winding mandrel 21, 31 for producing a (in top view) rectangularly wound winding element 27, 37 using a device according to FIG. 6 or 7. FIG. 8 shows in a sectional view perpendicular to the mandrel longitudinal axis a mandrel 21, 31 which can be used when the wound wire of winding element 27, 37 undergoes no change in cross section in the region of the winding head. In such a case, it is sufficient to configure the mandrel 21, 31 having three parts. However, if the wire cross sections are also formed in the region of the winding head of coil 27, 37, then mandrel 21, 31 is to be divided in a more complex shape and to be configured, for example, in the shape of a 5-part mandrel 21, 31, as shown in FIG. 9.

A time and thus cost-saving effect is achieved with the above embodiments of a method according to the invention for producing a winding element 7, 17, 27, 37 described with reference to FIGS. 1A to 9 because wire 2 is wound onto mandrel 1, 11, 21, 31 while its cross section is simultaneously changed from a round to a non-round (e.g. rectangular or trapezoidal) shape. Separate method steps and therefore separate tool assemblies for the three-dimensional winding, on the one hand, and the cross-sectional change of the wire, on the other hand, are therefore not required, which advantageously leads not only to a significant reduction in the production time but also to a reduction in tooling costs.

Figure 10A:
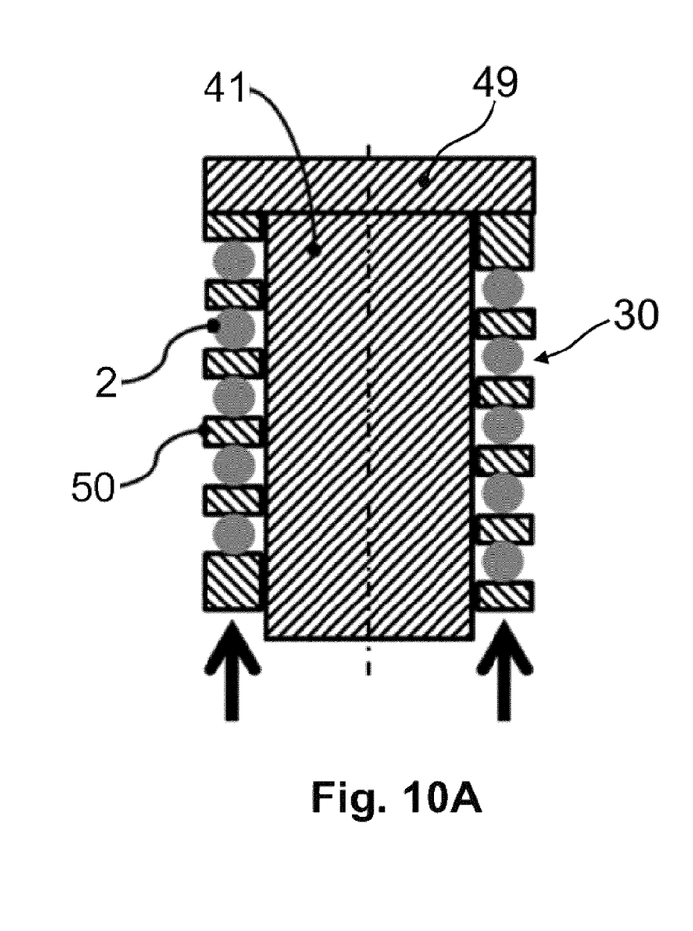
FIGS. 10A and 10B show two alternative embodiments of a device according to the invention for producing a winding element using a mandrel with a flexible groove in a schematic longitudinal sectional view.
Figure 10B:
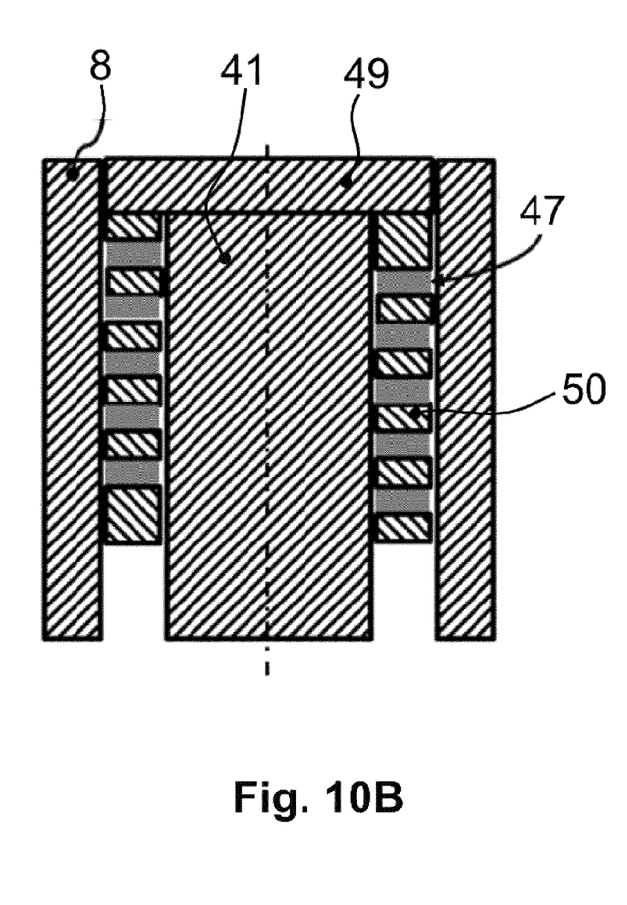

However, there are drawbacks when using mandrels 1, 11, 21, 31 without or with fixed grooves 10, 20 which could be remedied by using a flexible groove 30. Accordingly, an alternative embodiment of a device according to the invention for producing an electrical coil 47 is shown in FIGS. 10A and 10B in temporally successive stages of the method. This device comprises a mandrel 41 with a head piece 49 that is expanded in diameter, where a helical compression spring 50 is pushed in its entire length onto mandrel 41 and supported with its end in the axial direction against head piece 49, so that mandrel 41 as a result seamlessly fills the internal geometry of compression spring 50.

Compression spring 50 serves as a forming tool to convert the wire cross section to a desired rectangularly flattened geometry. For this purpose, compression spring 50 is made of resilient wire material having a rectangular cross-sectional contour, where the individual turns of the spring body are wound in a spaced manner. As a result, a flexible helical groove 30 having a rectangular cross section separate from the mandrel 41 is formed between the turns of compression spring 50 and serves to receive electrically conductive wire 2 to be wound around mandrel 41.

According to FIG. 10A, sufficient clearance is available when the compression spring 50 is relaxed (i.e. with the maximum widened groove 30 between the turns of compression spring 50) for drawing/winding supplied round wire 2 into groove 30 formed by compression spring 50 during the rotation of mandrel 41. Mandrel 41 with compression spring 50 mounted thereonto and round wire 2 wound therein is subsequently inserted with an almost accurate fit into a hollow cylindrical sleeve 8 (which represents a die in the broadest sense). A force that compresses compression spring 50 is then exerted in the direction of the arrow by a sleeve-shaped punch tool (not graphically reproduced). As a result, the wire cross section of winding element 47 between the turns of compression spring 50 is press formed from its initial round cross section (according to FIG. 10A) to the desired rectangular final cross section (according to FIG. 10B). Ideally, the region of contact is also directly formed in this forming operation in order to make winding element 47 take its final shape ready to be installed.

With a device according to FIGS. 10A and 10B, winding elements 47 can be produced which in top view (parallel to the coil longitudinal axis) have any desired shape, i.e. not only having round but also, for example, having rectangular winding shapes. For this purpose, only mandrel 41, compression spring 50, sleeve 8 and the punch tool must each have a corresponding cross-sectional configuration perpendicular to their longitudinal axis.

When using the tool setup shown in FIGS. 10A and 10B with a helical compression spring 50 mounted on a mandrel 41 for realizing a flexible spiral groove 30—in the case of a round coil geometry seen in top view—after winding and forming wire 2, removing the completed winding element 47 can be accomplished simply in that winding element 47 is screwed out of compression spring 50 similar to a thread. With a geometry deviating from a circular shape, mandrel 41 can be withdrawn and winding element 47 be removed laterally from compression spring 50.

A conical outer geometry of winding element 47 can be realized by a corresponding geometric configuration of compression spring 50 and of the tool part (e.g. of sleeve 8 according to FIG. 10B) for guiding compression spring 50 during the cross-sectional forming process. Ideally, the forming process is initiated from the wide side of the tool. In this context, it is advisable to subject wire 2 to heat treatment prior to the forming process in order to obtain the conical formation with the forming properties required for this.

In order to facilitate the flow of the wire material in a radial direction of mandrel 41 in the forming process of the wire cross section between the respective axially adjacent turns of compression spring 50 shown in FIGS. 10A and 10B, the individual turns of compression spring 50 can be provided with lubrication or a coating. With an adjustment of the lubrication or coating variable in the wire longitudinal direction of compression spring 50 and friction consequently arising unequally during the forming process, the material flow in the radial direction can also be selectively influenced to obtain an—in top view—desired winding element geometry e.g. a conically shaped winding element.

Although the winding and the cross-sectional forming process take place in successive steps according to FIGS. 10A and 10B, there is still the significant advantage over prior art that expensive application-specific tools (such as the complex embossing tool proposed in DE 10 2013 012 659 A1) can be dispensed with. Instead, the device according to the invention is extremely simple and versatile in its configuration.

In comparison to the solution approach according to FIGS. 6 and 7 with a fixed groove 10, 20 formed into the outer circumferential surface of mandrel 21, 31, the use of a compression spring 50 with a flexible groove 30 has the further advantage that winding elements 47 having wire cross sections that deviate from an ideal rectangular shape can also be produced. For this purpose, only inserts 60 according to FIGS. 11 and 12 must be arranged in flexible groove 30 between the turns of compression spring 50. Such inserts 60 can be formed by ring segments or an additional compression spring which are either connected in advance to the compression spring or pushed onto winding mandrel 41 separately from the compression spring.

Figure 11:
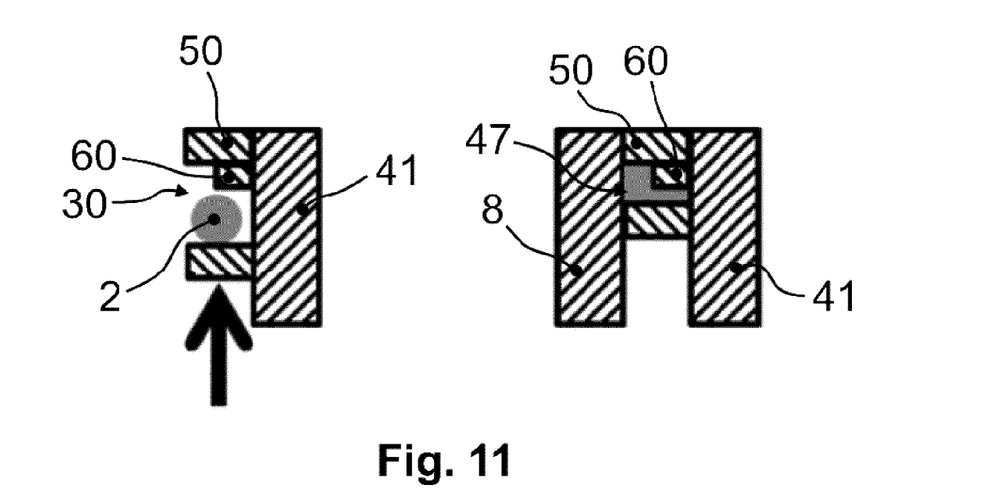
FIGS. 11 and 12 show two alternative embodiments for the further development of the device shown in FIGS. 10A and 10B in an enlarged longitudinal sectional view in the region of an insert.
Figure 12:
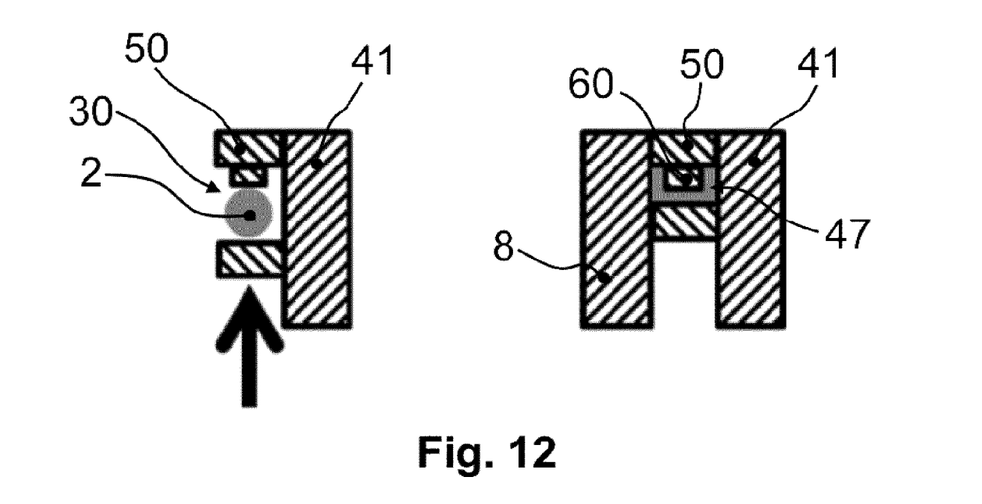

In order to introduce additional embossings/depressions into the rectangular cross-sectional profile of the wire of winding element 47, inserts 60 provided in FIGS. 11 and 12 are smaller in their length measured parallel to the longitudinal axis of the mandrel and in their width measured parallel to the radial direction of the mandrel than the corresponding length and width of groove 30 formed between the turns of compression spring 50. The two embodiments of FIGS. 11 and 12 differ in terms of the radial positioning of insert 60. While insert 60 according to FIG. 11 abuts flush against the outer surface of mandrel 41 in order to thus obtain a winding element 47 with an L-shaped wire cross-sectional profile after the pressing process, insert 60 in FIG. 12 is arranged spaced from the outer surface of mandrel 41 in the radial direction centrally within flexible groove 30, whereby a winding element 47 with a U-shaped wire cross-sectional profile is obtained after the pressing process. The continuous depression (bead) introduced according to FIG. 11 or 12 in the L-profile or the U-profile, respectively, of the wire cross section can serve, for example, to pass cooling media and/or to develop a stabilizing (reinforcing) effect.

The main field of application of winding elements 7, 17, 27, 37, 47 produced according to the invention are electrical machines (such as generators, motors, transformers) and components (electrotechnical coils, inductors or other inductive components). However, the invention can further be used advantageously wherever flat profiles need to be bent around tight radii and the conventional change of the cross section leads to drawbacks.

The invention claimed is:

1. Device for producing a winding element from a supplied wire, comprising:
   a mandrel rotatable about its central longitudinal axis or a die rotatable about its central longitudinal axis around which or into which said supplied wire can be wound; and
   a forming tool which is configured and arranged to exert a cross-sectional forming force upon said wire at a winding point of said wire onto said mandrel or at a winding point of said wire in said die, wherein said forming tool is configured as a section roller that is rotatable about its central longitudinal axis, and wherein said central longitudinal axis of said section roller is set at an angle relative to the central longitudinal axis of said mandrel and said die, respectively.

2. Device according to claim 1, wherein said mandrel or said die, respectively, is provided with a stationary shoulder, where said mandrel and/or said section roller or said die and/or said section roller, respectively, are configured to be slidable in their longitudinal direction during the winding process.

3. Device according to claim 2, wherein said section roller is positionable in the radial direction relative to said mandrel or relative to said die, respectively, to thereby produce a conical winding element.

4. Use of a winding element produced with a device according to claim 2, as an electrical coil or inductor for an electrical machine or other power component.

5. Device according to claim 1, wherein said mandrel or said die, respectively, is provided with a movable shoulder, where said shoulder is configured to execute an advancing motion during the winding process in the longitudinal direction of said mandrel or said die, respectively.

6. Device according to claim 5, wherein said section roller is positionable in the radial direction relative to said mandrel or relative to said die, respectively, to thereby produce a conical winding element.

7. Use of a winding element produced with a device according to claim 5, as an electrical coil or inductor for an electrical machine or other power component.

8. Device according to claim 1, wherein said section roller is positionable in the radial direction relative to said mandrel or relative to said die, respectively, to thereby produce a conical winding element.

9. Use of a winding element produced with a device according to claim 1, as an electrical coil or inductor for an electrical machine or other power component.

10. Device for producing a winding element from a supplied wire, comprising:
a mandrel rotatable about its central longitudinal axis or a die rotatable about its central longitudinal axis around which or into which said supplied wire can be wound; and
a forming tool which is configured and arranged to exert a cross-sectional forming force upon said wire at a winding point of said wire onto said mandrel or at a winding point of said wire in said die,
wherein said forming tool is configured as a section roller that is rotatable about its central longitudinal axis, and
wherein said mandrel or said die, respectively, is provided with a stationary shoulder, where said mandrel and/or said section roller or said die and/or said section roller, respectively, are configured to be slidable in their longitudinal direction during the winding process.

11. Device according to claim 10, wherein said section roller is positionable in the radial direction relative to said mandrel or relative to said die, respectively, to thereby produce a conical winding element.

12. Use of a winding element produced with a device according to claim 10, as an electrical coil or inductor for an electrical machine or other power component.

13. Device for producing a winding element from a supplied wire, comprising:
a mandrel rotatable about its central longitudinal axis or a die rotatable about its central longitudinal axis around which or into which said supplied wire can be wound, and a forming tool which is configured and arranged to exert a cross-sectional forming force upon said wire at a winding point of said wire onto said mandrel or at a winding point of said wire in said die,
wherein said mandrel or said die, respectively, is provided with a movable shoulder, where said shoulder is configured to execute an advancing motion during the winding process in the longitudinal direction of said mandrel or said die, respectively.

14. Device according to claim 13, wherein said forming tool is configured as a section roller that is rotatable about its central longitudinal axis.

15. Device according to claim 14, wherein said section roller is positionable in the radial direction relative to said mandrel or relative to said die, respectively, to thereby produce a conical winding element.

16. Use of a winding element produced with a device according to claim 14, as an electrical coil or inductor for an electrical machine or other power component.

17. Use of a winding element produced with a device according to claim 13, as an electrical coil or inductor for an electrical machine or other power component.

* * * * *